United States Patent [19]

Okamuro

[11] 4,050,139

[45] Sept. 27, 1977

[54] PISTON PIN INSTALLING AND REMOVING APPARATUS

[75] Inventor: James A. Okamuro, Kalamazoo, Mich.

[73] Assignee: Borroughs Tool & Equipment Corporation, Kalamazoo, Mich.

[21] Appl. No.: 698,671

[22] Filed: June 22, 1976

[51] Int. Cl.[2] .......... B23Q 1/00

[52] U.S. Cl. .......... 29/283; 29/257

[58] Field of Search .......... 29/251, 255, 257, 276, 29/280, 282, 283, 256, 258, 263, 200 D, 200 P; 269/296

[56] References Cited

U.S. PATENT DOCUMENTS

| | | | |
|---|---|---|---|
| 1,596,293 | 8/1926 | Neil | 29/256 |
| 1,841,190 | 1/1932 | Justiss | 29/263 |
| 2,167,897 | 8/1939 | Kulp | 29/257 |
| 2,386,104 | 10/1945 | Galley | 29/256 |
| 2,891,302 | 6/1959 | Fuglie et al. | 29/251 |
| 3,031,744 | 5/1962 | Stein | 29/283 |
| 3,050,840 | 8/1962 | Dunkerley | 29/263 |

FOREIGN PATENT DOCUMENTS

| | | | |
|---|---|---|---|
| 922,820 | 2/1947 | France | 29/256 |

*Primary Examiner*—James L. Jones, Jr.

*Attorney, Agent, or Firm*—Blanchard, Flynn, Thiel, Boutell & Tanis

[57] ABSTRACT

A component for use in a piston pin remover and replacer device for assembling and disassembling the piston pin connection between a connecting rod and a piston head. The component is comprised of a base and an anvil member mounted on the base. The anvil member has a bifurcated portion which is composed of a pair of spaced apart legs which are spaced upwardly from the base. A rim is mounted on the inside part of the legs and extends coextensively therewith. The rim also extends in an arc between the legs at the bight portion of the bifurcated portion. A hollow sleeve member has an opening therein, the extended axis of which extends between the spaced apart legs and is equidistant from the rim throughout all parts of the arc. An arbor member is slidably mounted in the hollow sleeve member. A stop is provided inside the hollow sleeve member and a spring is provided for urging the arbor member to a position extending out of the hollow sleeve member and away from the stop. The arbor member has a pair of spacers thereon, one spacer being reciprocably mounted on the arbor member and the other spacer being removable from a position between the first-mentioned spacer and the free end of the arbor member.

7 Claims, 11 Drawing Figures

FIG. 1
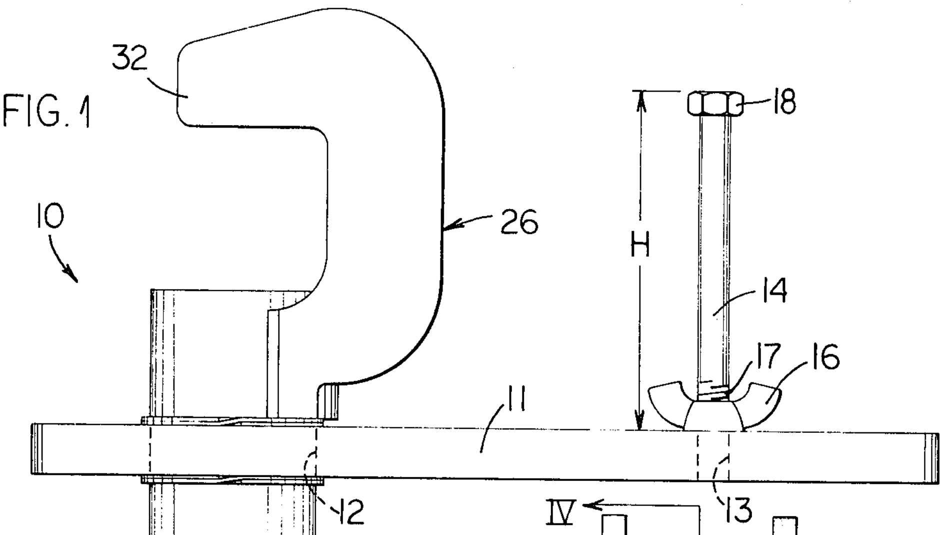
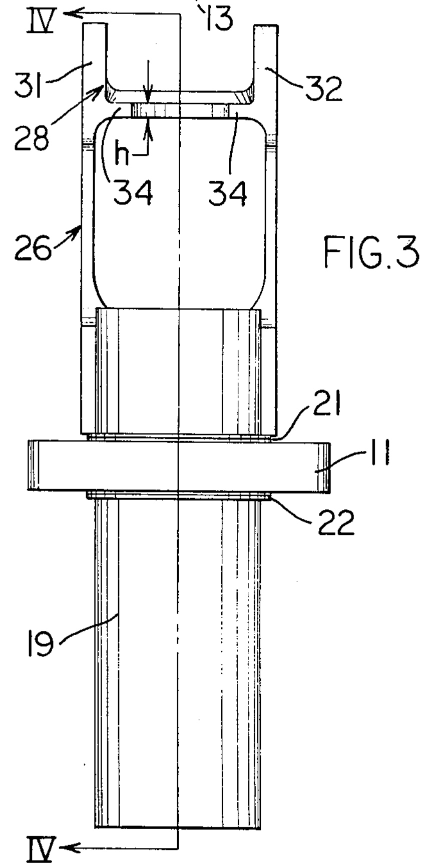
FIG. 3
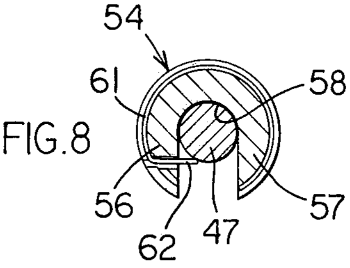
FIG. 8
FIG. 2
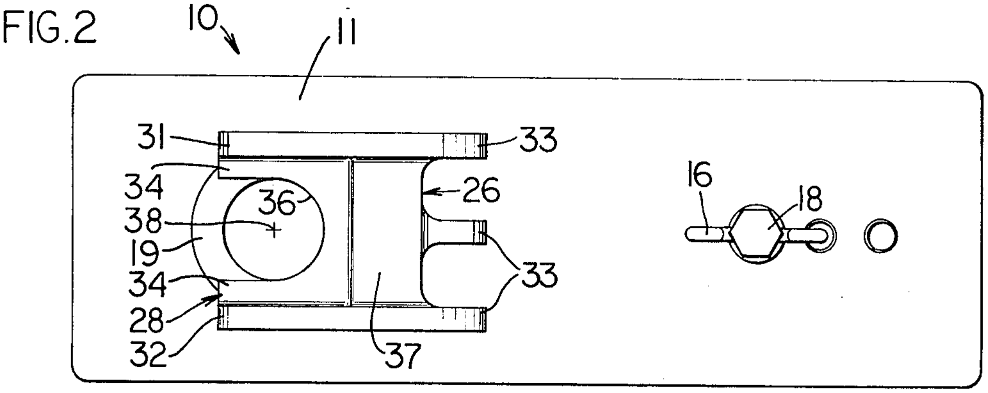

PISTON PIN INSTALLING AND REMOVING APPARATUS

FIELD OF THE INVENTION

This invention relates to a component for use in a piston pin remover and replacer device for assembling and disassembling the piston pin connection between a connecting rod and a piston head and, more particularly, to a component wherein a direct engagement thereof is with the connecting rod rather than the piston head to minimize the likelihood of permanent deformation of the piston head during the assembling or disassembling procedure.

BACKGROUND OF THE INVENTION

Piston pin remover and replacer devices have been known for many years and one type of such device is illustrated in an advertisement appearing in the March, 1976 issue of "Motor Age" magazine, Page 105. With this particular device, during removal of the piston pin, the piston head is placed onto an anvil member and a drive pin engages the end of the pin remote from the anvil and drives the pin out of the piston head and the associated connecting rod. Manufacturing techniques are ever changing and the ability of the side skirt of the piston head to withstand the forces necessary to drive the piston pin from its press fit engagement with the connecting rod is no longer possible. Accordingly, a component for use in a piston pin remover and replacer device which is capable of adequately supporting the piston head and connecting rod during assembly or disassembly of the piston pin and without effecting a deformation of the piston head is highly desirable.

Accordingly, it is an object of this invention to provide a component for use in a piston pin remover and replacer device which adequately supports the piston head and connecting rod during assembly or disassembly of the piston pin without effecting a deformation of the piston head.

It is a further object of this invention to provide a component, as aforesaid, which is inexpensive to manufacture and is durable to withstand all types of abuse given tools in a mechanic's environment.

It is a further object of this invention to provide a component, as aforesaid, which is simple to operate, requiring a minimum of instruction.

It is a further object of this invention to provide a support for the piston head and connecting rod wherein a direct engagement of a support is with the connecting rod rather than the piston head.

It is a further object of this invention to provide an alignment mechanism on the component, as aforesaid, to align the opening in the connecting rod and the openings in the piston head to effect a proper installation of a piston pin.

It is a further object of this invention to provide a stop device for limiting the extent to which the piston pin inserted into the aligned openings in the connecting rod and the piston head so that the piston pin will project outwardly from the side skirt of the piston head an equal amount on both sides thereof.

SUMMARY OF THE INVENTION

The objects and purposes of the invention are met by providing a component for use in a piston pin remover and replacer device for assembling and disassembling the piston pin connection between a connecting rod and a piston head. The component is comprised of a base, an anvil member mounted on the base and having a bifurcated portion comprised of a pair of spaced apart legs spaced upwardly from the base, a rim mounted on the inside part of the legs and extending coextensively therewith, the rim also extending in an arc between the legs at the bight portion of the bifurcated portion and a hollow sleeve member having an opening therein, the extended axis of which extends between the spaced apart legs and is equidistant from the rim throughout all parts of the arc.

The objects and purposes of the invention are also met by providing an arbor member which is slidably mounted in the hollow sleeve member and includes adjustable stop means and resilient means for urging the arbor member to a position extending out of the hollow sleeve member and away from the stop means, the arbor member including a pair of spacers, one of the spacers being reciprocally mounted on the arbor member and the other spacer being removably mounted to the arbor member between the first-mentioned spacer and the free end of the arbor member.

BRIEF DESCRIPTION OF THE DRAWINGS

Other objects and purposes of this invention will be apparent to persons acquainted with apparatus of this general type upon reading the following specification and inspecting the accompanying drawings, in which:

FIG. 1 is a side elevational view of the component for use in a piston remover and replacer device embodying the invention;

FIG. 2 is a top view thereof;

FIG. 3 is an end elevational view thereof;

Figure 9:
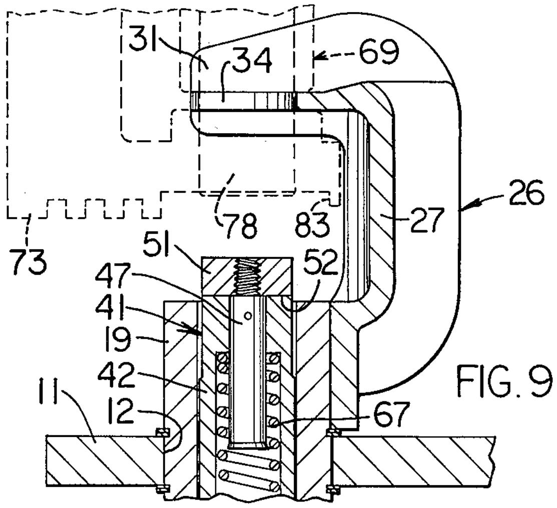
Figure 7:
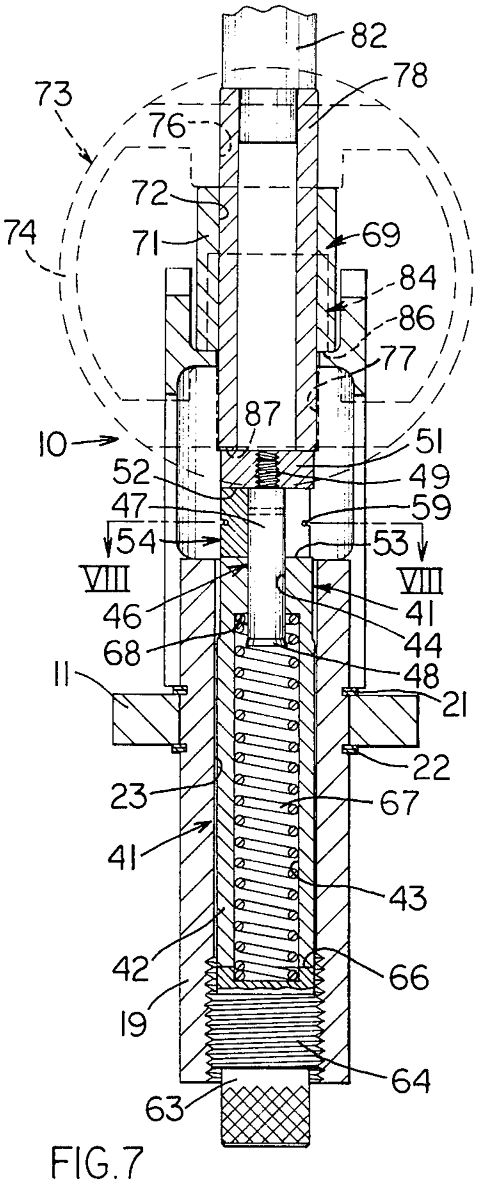
FIG. 7 is a sectional view similar to the sectional view of FIG. 6 but showing the entirety of the piston pin remover and assembly device.
Figure 10:
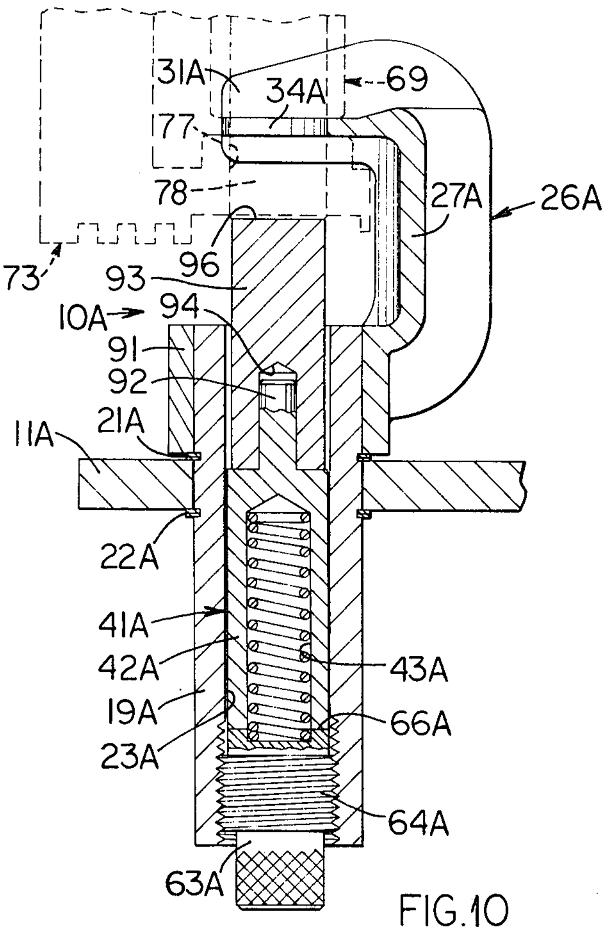
Figure 11:
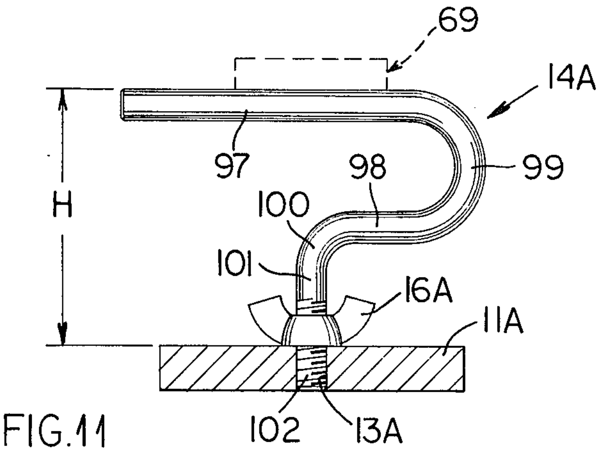

FIT. 8 is a sectional view taken along the line VIII—VIII of FIG. 7;

FIG. 9 is a sectional view of the arbor member but with a removal spacer member removed from engagement with the arbor member;

FIG. 10 is a central sectional view of an alternate construction of the component; and FIG. 11 is a section view of a modified connecting rod support.

Certain terminology will be used in the following description for convenience in reference only and will not be limiting. The words "up", "down", "right" and "left" will designate directions in the drawings to which reference is made. The words "in" and "out" will refer to directions toward and away from, respectively, the geometric center of the device and designated parts thereof. Such terminology will include the words above specifically mentioned, derivatives thereof and words of similar import.

DETAILED DESCRIPTION

Figure 4:
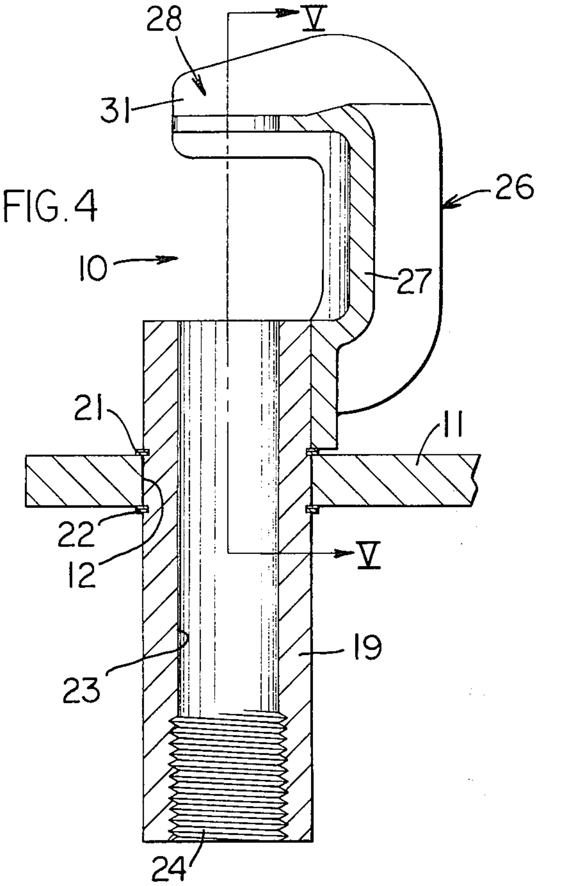
FIG. 4 is a sectional view taken along the line IV—IV of FIG. 3.
Figure 6:
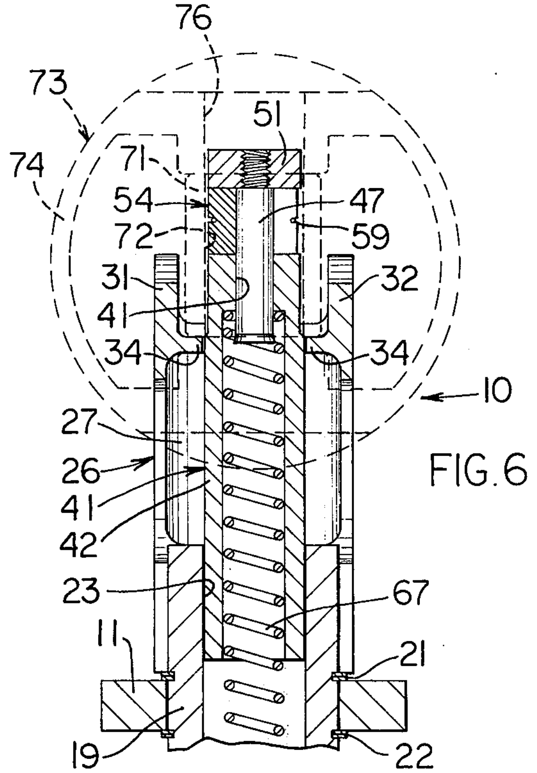
FIG. 6 is a sectional view similar to the sectional view of FIG. 5 but with an arbor member inserted in the hollow sleeve member and embodying the invention.

The component 10 (FIG. 1) for use in a piston pin remover and replacer device includes a base plate 11 having a pair of openings 12 and 13 therethrough. The opening 13 is threaded and is adapted to receive one end of a threaded bolt 14 therein. A wing nut 16 is threaded onto the threaded portion 17 of the bolt 14 between the plate 11 and the head 18 thereof and is adapted to lock the position of the bolt 14 to the plate 11 so that the height "H" of the head 18 above the upper surface of the plate 11 is controllable and maintainable. A hollow sleeve member 19 is received in the opening 12 and is rotatably retained therein by a pair of axially spaced clips 21 and 22 which engage opposite surfaces of the base plate 11 and which are retained in axially spaced grooves on the outer periphery of the hollow sleeve member 19. The hollow sleeve member 19 has an opening 23 extending therethrough, which opening 23 has an axis 38 (FIG. 2) parallel to the longitudinal axis of the hollow sleeve member 19. One end of the opening 23 is threaded as at 24. An anvil member 26 is secured to the upper end of the hollow sleeve member 19 by any convenient means, such as a plurality of screws, not illustrated. The anvil member 26 has a body portion 27 which extends upwardly beyond the upper end of the hollow sleeve member 19 and has a bifurcated portion 28. The bifurcated portion 28 has a pair of laterally spaced and parallel legs 31 and 32 which extend leftwardly from the upper edge of the body portion 27 as best illustrated in FIGS. 2 and 4. The rightward part of the body portion 27 is reinforced by a plurality of reinforcing ribs 33. A rim structure 34 is provided on the inside surface of each of the legs 31 and 32 (FIG. 2). The thickness "*h*" (FIG. 3) of the rim 34 is accurately controlled during the manufacture of the body portion 27 of the anvil member 26. The rim 34 has an arc 36 therein which extends across the bight portion 37 between the two legs 31 and 32 of the bifurcated portion 28. The arc 36 has a radius which is coincident with the extended axis 38 of the opening 23 in the hollow sleeve member 19.

An arbor device 41 is illustrated in FIGS. 6 to 9. The arbor device is comprised of a rod 42 reciprocably received in the opening 23 in the hollow sleeve member 19. The rod 42 has an opening 43 therein which opens axially outwardly at the lower end thereof as illustrated in FIG. 7. A smaller diameter, axially extending, opening 44 is provided through the upper bottom end of the opening 43, namely at the upper end of the rod 42.

A T-shaped member 46 is reciprocably mounted in the opening 44. The T-shaped spacer member 46 is comprised of an elongated rod 47 reciprocally received in the opening 44 and having a flared end as at 48, the diameter of the flared end being greater than the diameter of the opening 44. The flared end 48 is located in the opening 43 so that the T-shaped spacer member 46 is limited in its travel upwardly relative to the rod 42. A thread 49 is provided on the end of the rod 47 remote from the flared end 48. A generally cylindrical disk 51 having a threaded opening in the center thereof is threaded onto the threaded end 49 of the rod 47 thereby defining the T-shaped spacer member 46. The lower surface 52 of the disk 51 is adapted to be spaced from the upper surface 53 of the rod 42 by sliding the rod 47 in the opening 44. A generally U-shaped spacer 54 is adapted to be received between the lower surface 52 of the disk 51 and the upper surface of the rod 42. The U-shaped spacer 54 has a pair of legs 56 and 57 which are adapted to straddle the rod 47 (FIG. 8). The legs 56 and 57 of the U-shaped spacer 54 are connected by a bight portion having an arcuate surface 58, the radius of which coincides with the radius of the rod 47 as illustrated in FIG. 8. The outer diameter of the U-shaped spacer 54 is generally cylindrical and coincides with the outer diameter of the disk 51 as illustrated in FIG. 7. A groove 59 is provided in the periphery of the U-shaped spacer 54 and has a generally C-shaped spring clip 61 located therein. The spring clip 61 has a resilient finger 62 thereon which is spaced from the arcuate bight portion 58 a distance slightly less than the diameter of the rod 47 and projects into the space between the legs 56 and 57. As a result, when the U-shaped spacer 54 is inserted between the lower surface 52 of the disk 51 and the upper surface 53 of the rod 42, the legs 56 and 57 will straddle the rod 47 and the resilient finger 62 will serve to urge the rod 47 into engagement with the arc 58 to hold the U-shaped spacer 54 in the position illustrated in FIG. 7. A slight amount of lateral pressure applied to the U-shaped spacer member 54 in a direction perpendicular to the longitudinal axis of the rod 47 and parallel to the legs 56 and 57 will cause a flexing of the resilient finger 62 out of locking engagement to facilitate a removal of the spacer member 54.

An adjustable stop 63 having an external thread 64 thereon is received into the threaded end 24 of the opening 23 in the hollow sleeve member 19. The stop member 63 has an upper surface 66 thereon which is adapted to engage the lower end of the rod 42 when the rod 42 is retracted almost entirely into the opening 23 in the hollow sleeve member 19 as illustrated in FIG. 7. A spring 67 engages at the lower end thereof and extends between the stop member 63 and the bottom 68 of the opening 43 in the rod 42. The inside diameter of the opening 43 in the rod 42 is larger than the outer diameter of the rod 47 to facilitate the engagement of the upper end of the spring 67 with the bottom surface 68 of the opening 43 and the rod 42 and encircling the rod 47. The spring 67 is adapted to urge the rod 42 outwardly of the opening 23 in the hollow sleeve member 19 to a position illustrated in FIG. 6, for example.

OPERATION

Although the operation of the mechanism described above will be understood from the foregoing description by skilled persons, a summary of such description is now given for convenience.

Figure 5:
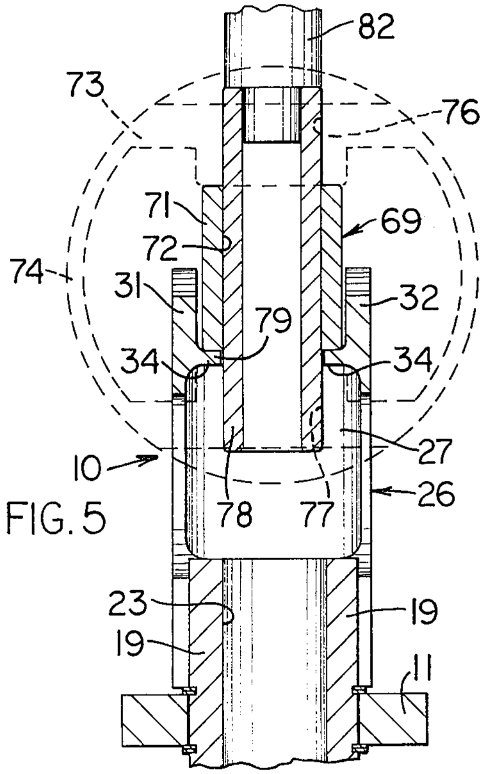
FIG. 5 is a sectional view taken along the line V—V of FIG. 4.

As is conventional construction of the connection between a connecting rod and a piston head, the connecting rod has an enlarged head 71 (FIG. 5) at one end thereof which has an opening 72 therethrough. Similarly, the piston head 73 (broken lines in FIG. 5) has a generally cylindrical skirt 74 thereon which has a pair of axially aligned holes 76 and 77 therein. A piston pin 78 is press fit into the opening 72 in the enlarged end 71 of the connecting rod 69. The outer diameter of the piston pin 78 is slidably received in the aligned holes 76 and 77 in the piston head 73. As a result, the piston head 73 is pivotal about the axis of the piston pin 78 relative to the connecting rod 69.

When it is desired to remove the piston pin 78 from engagement between the connecting rod 69 and the piston head 73, the assembled piston head 73 and connecting rod 69 is mounted onto the anvil member 26. A clearance space 79 is provided between the enlarged end 71 of the connecting rod 69 and an internal surface portion of the skirt 74 of the piston head 73 which has one of the holes 76 and 77 therein. The thickness "*h*" of the rim 34 is equal to or slightly less than the clearance space 79. As a result, the rim 34 on the legs 31 and 32 of the anvil member 26 is adapted to be received in the clearance space 79 and straddle the piston pin 78. The enlarged end 71 of the connecting rod 69 is supported on the upper surface of the rim 34. The radius of the piston pin 78 is preferably identical to the radius of the arc 36 of the rim 34. As a result, the axis of the piston pin 78 is axial with the axis 38 of the opening 23 in the hollow sleeve member 19. One end of the piston pin 78 is thereafter engaged by a conventional piston pin driver 82. A downward force applied on the piston pin 78 illustrated in FIG. 5 by a force generating member (not illustrated) will push the piston pin through the opening 72 in the enlarged end 71 of the connecting rod 69 into the opening 23 in the hollow sleeve member 19 to disconnect the connecting rod 69 from the piston head 73. The entire force of the piston pin driver 82 is applied to the lower surface of the enlarged end 71 (FIG. 5) of the connecting rod 69, which surface is in abutting engagement with the upper surface of the rim 34 on the legs 31 and 32. No force is applied to the skirt structure 74 of the piston head 73 since the piston pin freely slides in the openings 76 and 77. Since the connecting rod 69 is usually hardened, it is better adapted to withstand forces than the piston head structure 73. The end of the connecting rod (not illustrated) which is remote from the enlarged end 71 is supported on the head 18 of the bolt 14 (FIG. 1). The height "H" of the head 18 from the upper surface of the base member 11 is adjustable to hold the connecting rod 69 in a proper position so that the axis of the piston pin 78 will be coaxial with the axis 38 of the opening 23 in the hollow sleeve member 19 when the piston pin is to be removed.

When it is desired to assemble a piston head to the enlarged end 71 of the connecting rod 69, the arbor device 41 is inserted into the opening 23 of the hollow sleeve member 19. A stop member 63 is threaded into the lower end of the hollow sleeve member 19 to provide a support for the arbor device 41. The spring 67 urges the arbor device 41 to the position illustrated in FIG. 6 wherein the disk 51 and spacer 54 are located in the opening 72 in the enlarged end 71 of the connecting rod 69. The lower end of the rod 42 is spaced from the upper surface of the stop member 63. A T-shaped key 84 (broken lines in FIG. 7) is used to gauge the spacing between the upper surface of the rim 34 and the bottomed-out position of the upper surface of the disk 51. The adjustable stop 63 is adjusted so that the under surface 86 of the cross part of the T-shaped key 84 engages the upper surface of the rim 34 and the bottom surface 87 of the stem engages the upper surface of the disk 51.

A piston pin 78 (FIG. 7) is then placed into the opening 76 in the skirt 74 of the piston head 73 and the piston pin driver 82 is moved downwardly to forceably drive the piston pin 78 through the opening 72 in the enlarged end 71 of the connecting rod 69. The amount of relative movement between the piston pin 78 and the enlarged end 71 of the connecting rod 69 is limited by the position of the stop member 63 in the opening 23 of the hollow sleeve member 19. More specifically, when the rod 42 bottoms out due to an engagement of the rod 42 with the upper surface 66 of the stop member 63, downward movement of the piston pin 78 will be halted to properly locate the piston pin 78 relative to the outer skirt surface of the skirt 74 of the piston head 73.

On some surface heads, there is provided a lip 83 (FIG. 9) which can interfere with a removal of the assembled piston head and connecting rod. That is, with the disk 51 resting on top of the spacer 54, an attempt to remove the piston head 73 leftwardly from engagement with the anvil member 26 will effect an engagement of the lip 83 with the disk 51. The removable spacer 54 permits the lower surface 52 of the disk 51 to engage the upper surface of the rod 42 as illustrated in FIG. 9. As a result, the disk 51 is no longer in an interference position relative to the lip 83 and the assembled piston head 73 and the connecting rod 69 are capable of a removal from engagement with the anvil 26.

In this particular embodiment, the hollow sleeve member 19 is rotatable in the opening 12 in the base plate 11 to facilitate not only a simpler construction of the piston pin remover and replacer device but also to facilitate an easier handling of the piston head and connecting rod during either a piston removal procedure or a piston pin replacement procedure.

ALTERNATE CONSTRUCTION

FIGS. 10 and 11 illustrate an alternate construction of the component 10A. The construction of the component 10A is similar to the construction of the component 10 and, as a result, certain of the parts will be identified with the same reference numerals but with the suffix "A" added thereto.

Referring first to FIG. 10, a hollow sleeve 19A is mounted onto the plate 11A in the same manner as has been described above with respect to the embodiment of FIGS. 1 to 9. Clips 21A and 22A are received in annular grooves on the periphery of the hollow sleeve member 19A and engage opposite surfaces of the plate 11A.

The anvil member 26A is slightly different in the embodiment of FIG. 10 than the embodiment discussed above. Generally, however, the upper portion of the body 27A of the anvil member 26A is identical to the upper portion of the anvil member 26. However, the lower portion of the body 27A of the anvil member 26A is comprised of an annular ring 91 which encircles the upper portion of the hollow sleeve member 19A. The annular ring 91 is also snugly and slidably disposed on the upper end of the hollow sleeve member 19A to facilitate a removal therefrom. The remainder of the portion of the body 27A is, as has been stated above, identical to the body portion 27 described above.

The arbor device 41A is comprised of a rod 42A reciprocably received in the opening 23A in the hollow sleeve member 19A. The rod 42A has an opening 43A therein which opens axially outwardly at the lower end thereof. The upper end of the opening 43A is closed. A pin 92 extends axially upwardly form the upper end of the rod 42A. The pin 92 is less in diameter than the outer diameter of the rod 42A. In addition, the overall length of the rod 42A and pin 92 is less than the length of the hollow sleeve member 23A.

A spacer member 93 has a hole 94 in the axial end thereof adapted to receive the pin 92 therein. The diameter of the spacer 93 is less than the inner diameter of the opening 23A. The spacer 93 defines an extension of the arbor device 41 and also serves to define a predetermined spacing between the upper surface 96 and the upper surface 66A of the stop member 63A. The precise location of the upper surface 96 and the upper surface 66A of the stop member 63A is controlled by adjusting the stop member 63A axially into or out of the hollow sleeve member 19A.

During an assembly of a piston 78 into a connecting rod 69, the spacer member 93 is received into the axially aligned openings in the piston head 73 and the connecting rod 69. After the piston pin is driven through the connecting rod 69, the piston pin 78 will urge the arbor device 41A into the bottomed-out position illustrated in FIG. 10. As a result, the piston pin 78 will be precisely located in the assembled arrangement of the piston head 73 to the connecting rod 69. The piston head 73 and connecting rod 69 connected together by the piston pin 78 can be very easily removed from the component 10A by simply removing the anvil member 26A from engagement with the upper end of the hollow sleeve member 19A. The removal of the anvil member 26A from the upper end of the hollow sleeve member 19A is accomplished by simply lifting the anvil member 26A in a direction parallel to the longitudinal axis of the hollow sleeve 19A.

FIG. 11 illustrates a modified form of the bolt 14A. The bolt 14A is formed into a shape of a question mark having a pair of vertically spaced horizontal leg portions 97 and 98 connected by an arcuate section 99. The horizontal leg 98 is connected through an arcuate section 100 to a generally vertically extending lower portion 101 having a thread 102 at the lower end thereof. The thread 102 is threadedly received in an internally threaded opening 13A in the plate 11A. A wing nut 16A is utilized to lock the bolt 14A in the desired location. The height "H" of the upper surface of the horizontal leg portion 97 is controlled by the threaded engagement of the bolt 14A in the opening 13A in the base plate 11A. The connecting rod 69 is resiliently supported on the horizontal leg portion 97 and, in addition, the horizontal leg portion 97 facilitates a free lateral movement of the connecting rod 69 relative thereto.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A component for use in a piston pin remover and replacer device for assembling and disassembling the piston pin connection between a connecting rod and a piston head, said piston head having spaced walls which each have a first opening therein aligned with the other first opening, wherein said connecting rod has an end having a second opening therein adapted to receive said piston pin therein and wherein a clearance space exists between said end and said spaced walls of said piston head which have said aligned first openings therein, said component comprising:

base means;

a hollow sleeve member mounted on said base and having an opening therein; and an anvil member spaced from said hollow sleeve member and having a body portion and a bifurcated portion, said bifurcated portion being comprised of a pair of spaced apart legs spaced from said hollow sleeve member;

a rim of predefined uniform thickness thinner than the thickness of said legs mounted on the inside part of said legs and extending inwardly therefrom and coextensively therewith, the inner edge of said rim also extending in an arc between said legs at the bight portion of said bifurcated portion, both of the oppositely facing surfaces on said rim being flat and parallel with each other and contained in planes perpendicular to the extended axis of said opening in said hollow sleeve member which axis extends between said spaced apart legs and is equidistant from said rim throughout all parts of said arc whereby said rim directly engages and supports said end of said connecting rod with said first and second openings in alignment when a piston pin is forceably driven by drive pin means for movement relative to said end and said piston head to effect one of a removal and a replacement of said piston pin between said connecting rod and piston head; and an arbor member reciprocally and slidably movable in said hollow sleeve member, stop means in said hollow sleeve member, resilient means for resiliently urging said arbor member away from said stop means and out of said hollow sleeve member, said arbor member having a diameter accommodating reception in said aligned first and second openings whereby said arbor member is urged toward said stop means in response to an engagement with a piston pin moving relative to said connecting rod and piston head during assembly, said arbor member having a sufficient length to engage said stop means and simultaneously limit the extent of travel of said piston pin.

2. The component according to claim 1, wherein said body portion is fixedly secured to said hollow sleeve member.

3. The component according to claim 1, wherein said anvil member has a sleeve ring thereon slidably mounted on and encircling the upper end of said hollow sleeve member whereby said anvil member is movable relative to said hollow sleeve member.

4. The component according to claim 1, wherein said arbor member includes adjustable spacer means on the end thereof remote from the end of said arbor member adjacent said stop means in said hollow sleeve member and forming an extension of said arbor member for permitting a control of the spacing between said stop means and the remote end of said arbor member.

5. The component according to claim 4, wherein said adjustable spacer means includes a first spacer reciprocally mounted on said arbor member and movable between first and second positions and a second spacer removably mounted between said first spacer and said remote end of said arbor member.

6. The component according to claim 5, wherein said first spacer is generally T-shaped having a stem part guided in an opening in said remote end of said arbor member, the cross part of said T-shaped first spacer having a diameter equal to the diameter of said arbor member; and wherein said second spacer is generally U-shaped having a pair of spaced legs adapted to straddle said stem part.

7. A component for use in a piston pin remover and replacer device for assembling and disassembling the piston pin connection between a connecting rod and a piston head, said piston head having spaced walls which each have a first opening therein aligned with the other first opening, wherein said connecting rod has an end having a second opening therein adapted to receive said piston pin therein and wherein a clearance space exists between said end and said spaced walls of said piston head which have said aligned first openings therein, said component comprising:

base means including a support member laterally spaced from an anvil member on said base means and adapted for directly supporting said connecting rod at a location spaced from said one end of said connecting rod, said supporting member including resilient means for yielding to high forces applied to said connecting rod;

a hollow sleeve member mounted on said base and having an opening therein receiving said anvil member; and said anvil member being spaced upwardly from said hollow sleeve member and having a body portion and a bifurcated portion, said bifurcated portion being comprised of a pair of spaced apart legs spaced from said hollow sleeve member;

a rim of predefined uniform thickness thinner than the thickness of said legs mounted on the inside part of said legs and extending inwardly therefrom and coextensively therewith, the inner edge of said rim also extending in an arc between said legs at the bight portion of said bifurcated portion, both of the oppositely facing surfaces on said rim being flat and parallel with each other and contained in planes perpendicular to the extended axis of said opening in said hollow sleeve member which axis extends between said spaced apart legs and is equidistant from said rim throughout all parts of said arc whereby said rim directly engages and supports said end of said connecting rod with said first and second openings in alignment when a piston pin is forceably driven by drive pin means for movement relative to said end and said piston head to effect one of a removal and a replacement of said piston pin between said connecting rod and piston head.

* * * * *